US010000367B2

(12) United States Patent
Finkbeiner et al.

(10) Patent No.: US 10,000,367 B2
(45) Date of Patent: Jun. 19, 2018

(54) METHOD FOR OPERATING A LIFT SYSTEM

(71) Applicant: Gerhard Finkbeiner, Freudenstadt (DE)

(72) Inventors: Gerhard Finkbeiner, Freudenstadt (DE); Josef Fembock, Neuotting (DE)

(73) Assignee: Gerhard Finkbeiner, Freudenstadt (DE)

( * ) Notice: Subject to any disclaimer, the term of this patent is extended or adjusted under 35 U.S.C. 154(b) by 609 days.

(21) Appl. No.: 14/426,175

(22) PCT Filed: Sep. 5, 2013

(86) PCT No.: PCT/EP2013/068403
§ 371 (c)(1),
(2) Date: Mar. 5, 2015

(87) PCT Pub. No.: WO2014/040911
PCT Pub. Date: Mar. 20, 2014

(65) Prior Publication Data

US 2015/0225213 A1 Aug. 13, 2015

(30) Foreign Application Priority Data

Sep. 11, 2012 (DE) ........................ 10 2012 108 452

(51) Int. Cl.
*B66B 1/28* (2006.01)
*G05B 15/00* (2006.01)
*B66F 3/46* (2006.01)

(52) U.S. Cl.
CPC ...................................... *B66F 3/46* (2013.01)

(58) Field of Classification Search
CPC ......................................................... B66F 3/46
(Continued)

(56) References Cited

U.S. PATENT DOCUMENTS 6,634,461 B1 10/2003 Baker
7,219,770 B2 * 5/2007 Baker ........................ B66F 3/46 187/210
(Continued)

FOREIGN PATENT DOCUMENTS

CN 1238299 A 12/1999
CN 1375446 A 10/2002
(Continued)

OTHER PUBLICATIONS

International Search Report for corresponding patent application No. PCT/EP2013/068403 dated Nov. 12, 2013.
(Continued)

*Primary Examiner* — Jeffrey Donels
(74) *Attorney, Agent, or Firm* — Renner, Otto, Boisselle & Sklar, LLP

(57) ABSTRACT

The invention relates to a method for operating a lift system (19, 20, 21) that has at least two single-post lifts (11, 22-28), each of which comprises a control unit and a load receiving means (15), each control unit having a transmitter and a receiver. The method has the following steps: selecting a specified number of single-post lifts (11, 22-28) in order to form the lift system (19, 20, 21), starting up the single-post lifts (11, 22-28), and configuring the single-post lifts (11, 22-28) so as to form the lift system (19, 20, 21) by establishing a radio connection between the control units of the single-post lifts (11, 22-28) on a radio channel. The lift system (19, 20, 21) is set to a standby mode (29) after the single-post lifts (11, 22-28) are configured or after an actuation process is completed in order to raise or lower the load receiving means (15) of the single-post lifts (11, 22-28), wherein the receiver of each control unit is activated and the transmitter of each control unit is deactivated in the standby mode.

10 Claims, 5 Drawing Sheets

Figure 1:
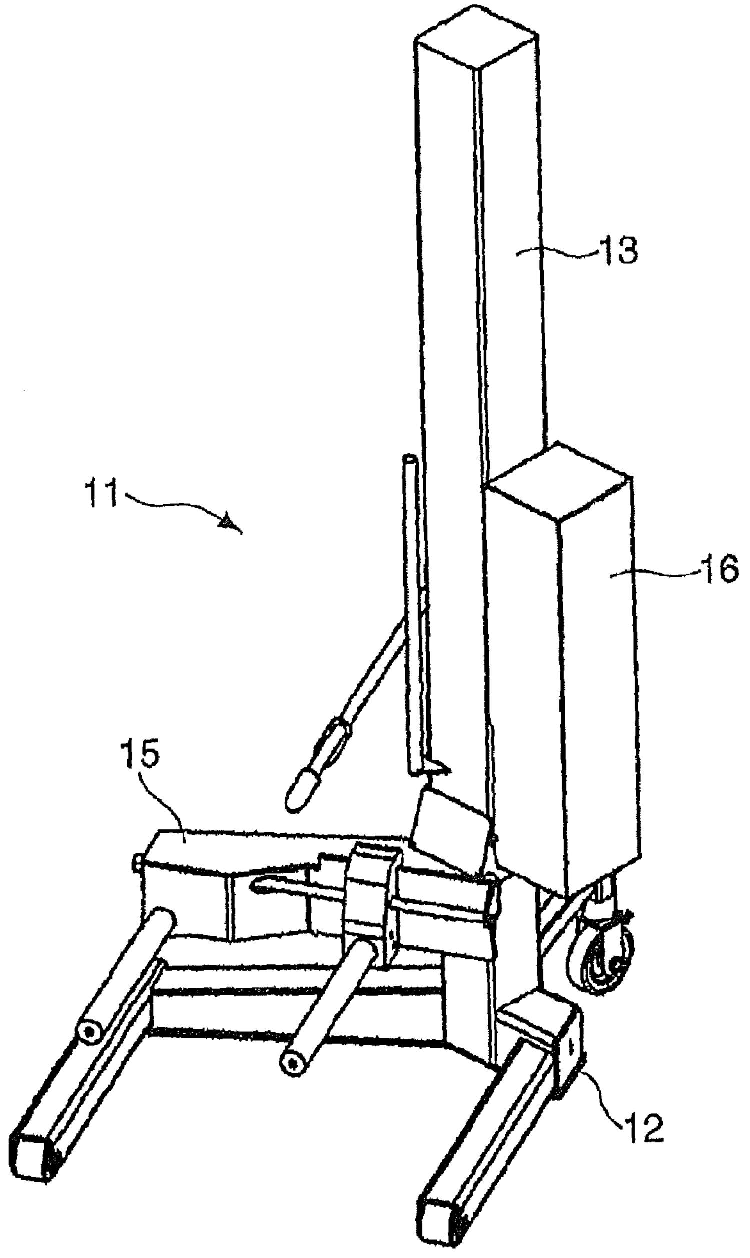

(58) Field of Classification Search
USPC .......................................................... 187/247
See application file for complete search history.

(56) References Cited

U.S. PATENT DOCUMENTS

| | | | | |
|---|---|---|---|---|
| 7,740,109 | B2 | 6/2010 | Möller et al. | |
| 9,334,145 | B2 * | 5/2016 | Fagan ....................... | B66F 3/46 |
| 9,611,128 | B2 * | 4/2017 | Van Houten ............. | B66F 3/46 |
| 2008/0277204 | A1 | 11/2008 | Möller et al. | |

FOREIGN PATENT DOCUMENTS

| | | | |
|---|---|---|---|
| CN | 1699137 | A | 11/2005 |
| CN | 1987700 | A | 6/2007 |
| DE | 603 13 633 | T2 | 1/2008 |
| DE | 11 2009 000 294 | T5 | 1/2011 |
| EP | 2 053 011 | A2 | 4/2009 |
| JP | H11349288 | A | 12/1999 |
| WO | 2004/024612 | A1 | 3/2004 |
| WO | 2009/099322 | A1 | 8/2009 |

OTHER PUBLICATIONS

Office Action for corresponding Chinese Patent Application No. 201380047338.6 dated Mar. 10, 2016.

* cited by examiner

METHOD FOR OPERATING A LIFT SYSTEM

The invention relates to a method for the operation of a lifting platform system for the lifting of loads, vehicles or similar.

A mobile lifting device is known from WO 2010/112200, which is referred to as single-column lifting platform. Such a lifting device comprises a mobile base frame having a lifting column arranged on it, in which a carrier having a load handling attachment arranged on it is movably operated up and down. For lifting and lowering, a lifting unit is provided which comprises at least one control unit and one hydraulic cylinder to move the load handling attachment up and down. To guarantee stability in mobile use, the base frame has three support points outside the load handling region.

U.S. Pat. No. 6,634,461 describes a lifting platform system which comprises a plurality of single-column lifting platforms. In order to lift a multi-wheeled vehicle in a steady manner by virtue of such a system, for example for the purpose of maintenance or repair, each of the single-column lifting platforms is positioned by means of its mobile base frame and attached to one of the vehicle wheels, so that each wheel rests on the corresponding load handling attachment of the single-column lifting platform assigned to it. The control units of the individual single-column lifting platforms are thereby wirelessly connected and can carry out uniform movements in a synchronised operating mode. In this mode, only one single-column lifting platform of the lifting platform system can be controlled directly by the user, while the remaining single-column lifting platforms are controlled synchronously in a coordinated movement by the single-column lifting platform which is controlled by the user. Such a hierarchical structure of the joint user control is known as master-slave architecture in the field of control technology.

U.S. Pat. No. 7,219,770 B2 describes a further development of this lifting platform system which enables the user to adjust the frequency provided for the wireless connection between the single-column lifting platforms. In this way, the operation of multiple structurally identical systems in direct proximity is made possible by a separate frequency being adjusted for each lifting platform system, without these interfering with each other as they coordinate due to signal interference.

Such an adjustment has the disadvantage that the maximum number of lifting platform systems which can be operated in a workshop at the same time is restricted by the frequency range, which is mostly regulated by law, of the radio network provided for wireless communication. Due to an existing radio connection between the single-column lifting platforms of each lifting platform system, several such systems can only be put into operation in parallel if their adjusted frequencies both differ. Due to the channel spacing of the radio technology used, which is mostly predefined and limited in the number of channels, the adjustment options of the user, however, are immanently limited to a fixed number of channels in this respect, which consequently also limits the number of lifting platform systems within the radio range which communicate on these channels.

The object of the invention is thus to create a lifting platform system which enables the uninterrupted operation of a large number of lifting platform systems on a limited installation surface.

According to the invention, this object is solved by a lifting device, wherein the lifting platform system is shifted into a standby mode after configuration of the single-column lifting platform or after termination of an actuation process for lifting and lowering of loads of the single-column lifting platforms, in which the receiver of each control unit is activated and the transmitter of each control unit is deactivated. In this way, a potentially unlimited number of lifting platform systems can be operated on an available radio channel on a spatially limited installation surface, wherein only one lifting platform system works out of the plurality of lifting platform systems which are provided in the installation surface.

A preferred embodiment of the invention provides that, in standby mode, a user-independent, preferably periodic testing of the adjusted radio channel takes place on possible radio communications of an additional, active lifting platform system, wherein a positive test result, i.e. confirmation of an additional active lifting system, shifts the lifting platform system which is placed in the testing phase into a passive operating mode until the detected radio communications are shut off. This passive operating mode, in which the radio communications of the active lifting platform system can be received, yet no individual radio signals are emitted, prevents interference of the active lifting platform system and ensures that at all times, no more than one lifting platform system operates out of several lifting systems within an installation surface which is covered by the radio range.

According to an advantageous development of the invention, a test is carried out in the standby mode when actuating an alarm button to establish whether the adjusted radio channel is occupied by other radio communications or is available for the control of the single-column lifting platforms belonging to the lifting platform system. Additionally, an enquiry for a possible operation is launched in order to avoid collision of radio signals with another active lifting platform system. A reservation of the adjusted radio channel is thus guaranteed for the lifting platform system, which can thus exclusively use the channel for communication up until the termination of the activity of the single-column lifting platforms assigned to it.

Provided that the radio channel is free when the alarm button of the lifting system is pressed, the system preferably switches into an active operating mode and carries out the lifting or lowering of the load.

In the event that the radio channel is occupied when the button is pressed, the standby mode is preferably maintained, i.e., that activation of the single-column lifting platforms of the lifting platform system is stopped. A further embodiment of the invention provides that, in the case of actuation of the alarm button when the radio channel is occupied, a free radio channel is searched for, to which, in the case of success, the lifting platform system adjusts its receiver and takes it as the current channel. This option has the advantage that, from this time on, both lifting platform systems can be operated at the same time on different channels without these interfering with each other in radio communications.

According to a preferred embodiment of the invention, the search for free radio channels is thereby restricted to radio channels of a predetermined frequency band. The interoperability of the individual platforms of a system is thus guaranteed, while at the same time, potential allowances from the legislating body with respect to the available frequency ranges can be conformed to.

Finally, an advantageous embodiment of the invention provides a decentralised operator unit for the configuration and/or control of the individual single-column lifting platforms of the lifting platform system. Such an embodiment of the invention allows the individual control of a plurality of lifting platform systems from one individual central workplace. This decentralised operator unit is defined as the master for the single-column lifting platforms which are configured to a lifting platform system, wherein the single-column lifting platforms themselves serve as slaves. Therefore, a master can control several lifting platform systems or a master can be provided as a separate operator unit for each lifting platform system. Alternatively, a single-column lifting platform of the lifting platform system can be defined or programmed as master, so that the additional incorporated single-column lifting platforms inside the lifting platform system are defined as slaves.

Figure 2:
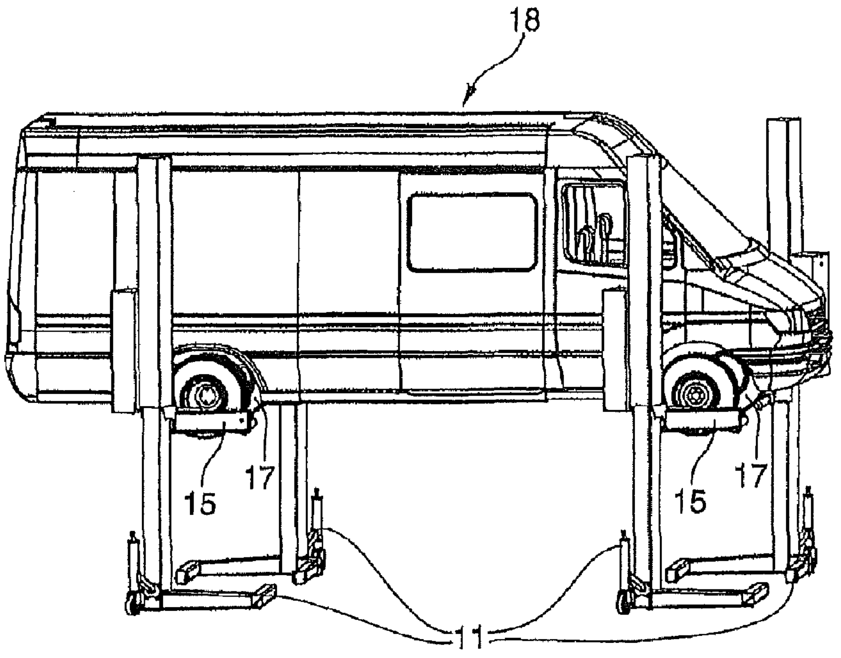
Figure 3:
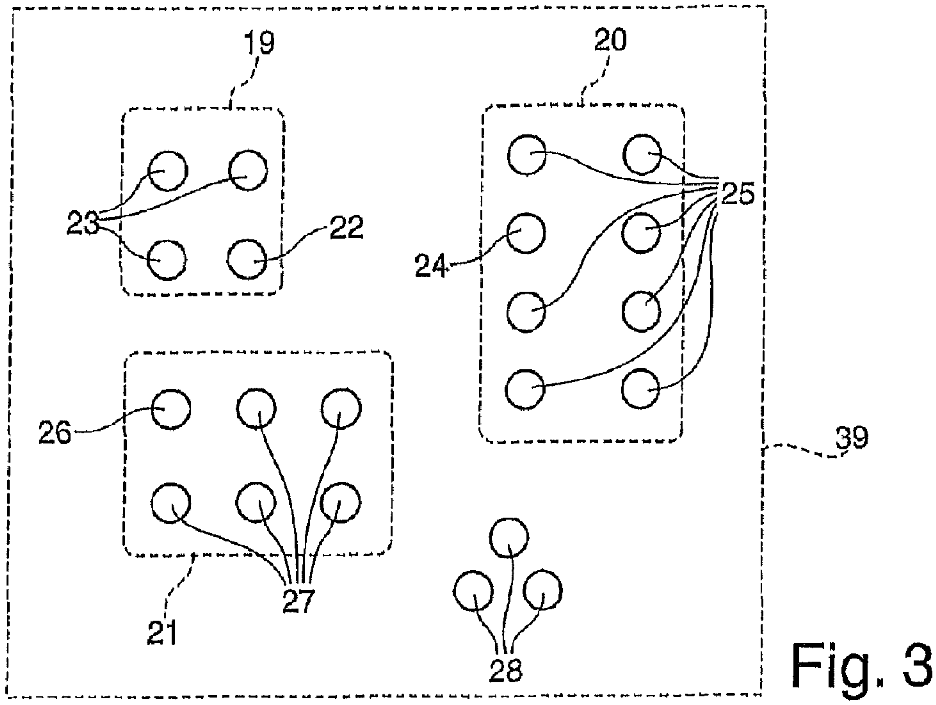
Figure 4:
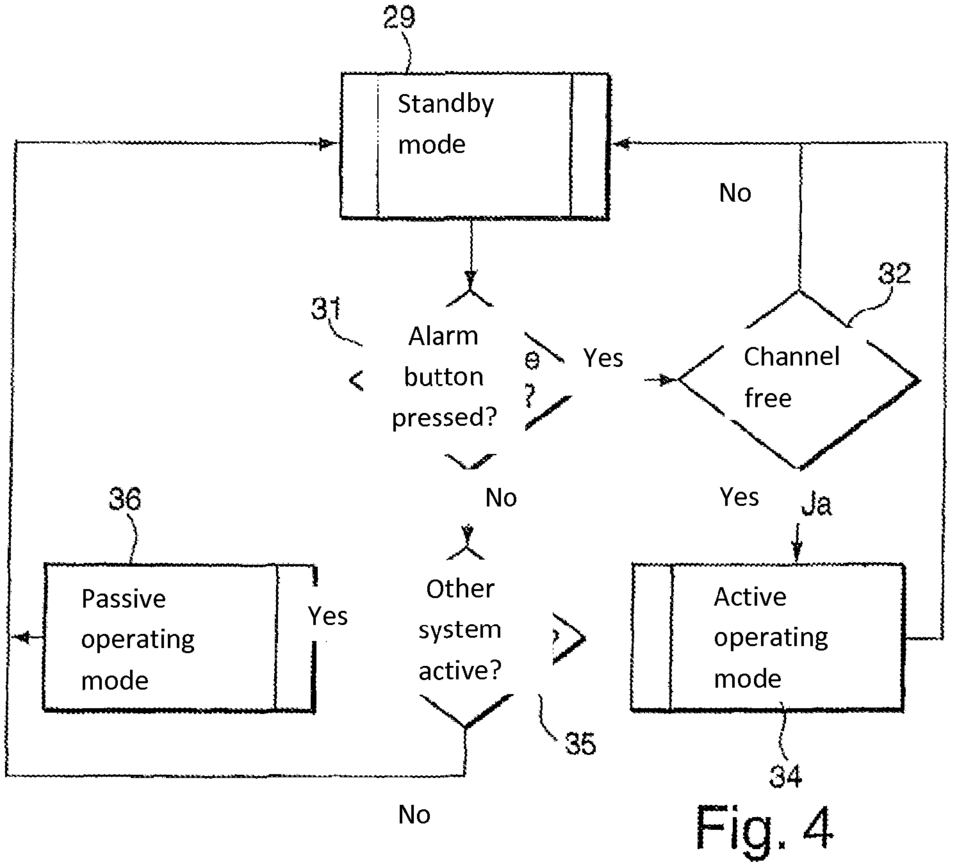
Figure 5:
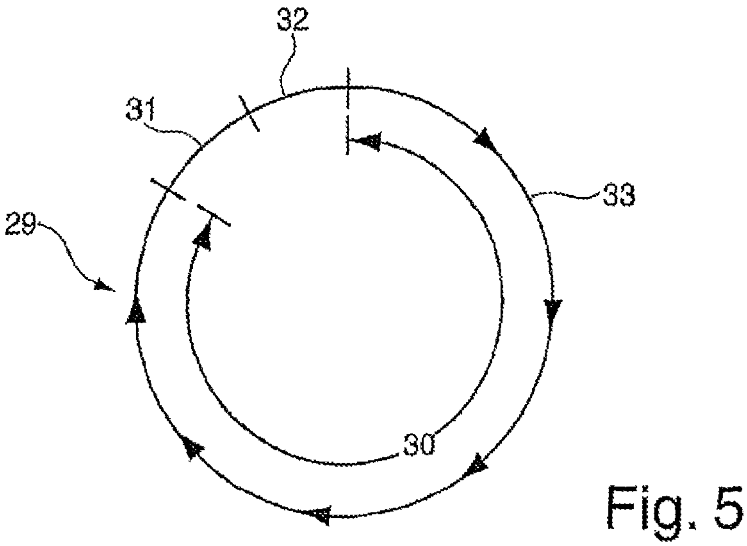
Figure 6:
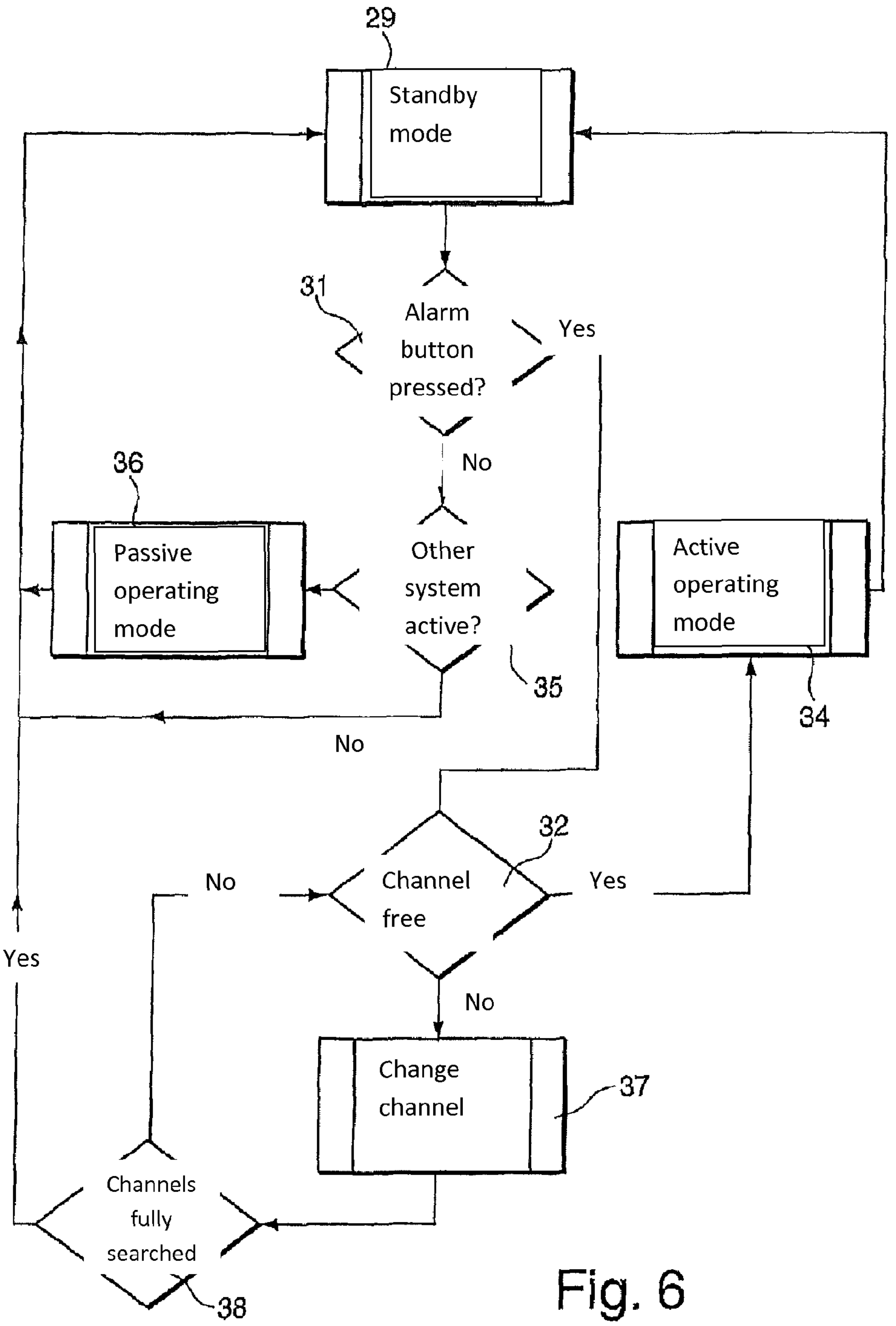
Figure 7:
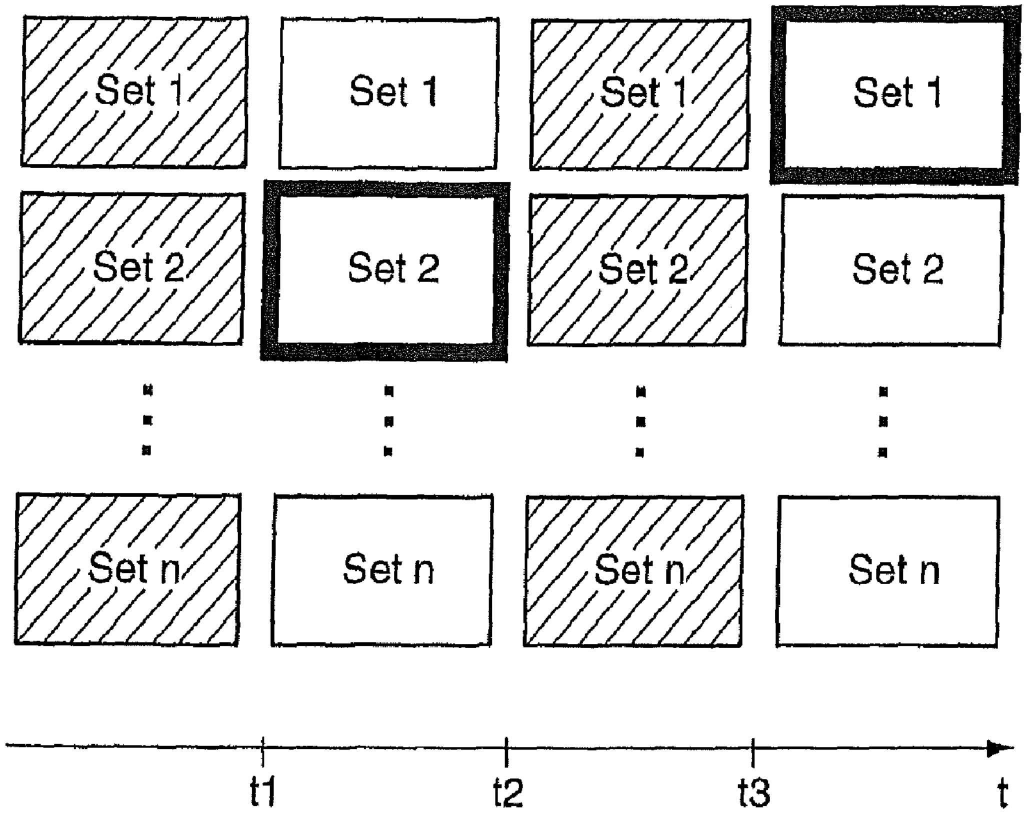

The invention as well as further advantageous embodiments and developments of the same are described and explained in more detail below by means of the examples represented in the drawings. The features to be gleaned from the description and the drawings can be applied individually or as a multiplicity in any combination according to the invention. Here are shown:

FIG. 1 a perspective view of a single-column lifting platform in a resting position, FIG. 2 a perspective view of a lifting platform system comprising four single-column lifting platforms in an upper end position, FIG. 3 a block diagram of a plurality of lifting platform systems, FIG. 4 a program flow chart of a lifting platform system, FIG. 5 a detailed representation of the standby mode in the case of long periods of inactivity, FIG. 6 an alternative program flow chart of a lifting platform system which is further developed than the embodiment of FIG. 4 and FIG. 7 a chronology of the operating modes for an alternating operation of several lifting platform systems.

In FIG. 1, a perspective view of a mobile single-column lifting platform 11 is shown in a resting position. Such a single-column lifting platform 11 comprises a mobile base frame 12 having a lifting column 13 arranged on it, in which a carrier 14 having a load handling attachment 15 arranged on it is movably operated up and down. For lifting and lowering, a lifting unit 16 is provided which comprises at least one control unit and one hydraulic cylinder to move the load handling attachment 15 up and down. To guarantee stability in mobile use, the base frame 12 has three support points outside the load handling region. Such a single-column lifting platform is known from DE 10 2012 106 073.6, to which reference is made in full. Alternatively, additional single-column lifting platforms 11 can also be applicable, which comprise at least one base frame 12, one load 16 and one lifting unit 16.

FIG. 2 shows the use of a lifting platform system 19, which, for example, comprises four single-column lifting platforms 11, which lie in an upper end position, for example for the purpose of wheel replacement as well as repair and/or maintenance activities. Four single-column lifting platforms 11 are thereby attached to the wheels 17 of a vehicle 18 according to FIG. 1 by means of its preferably mobile base frame 12 so that each wheel 17 rests on the corresponding load handling attachment 15, which is designed as a wheel gripping element, of the single-column lifting platform 11 respectively assigned to it. In the shown position, the vehicle 18 has already been taken to working height by means of a steady lifting movement of the wirelessly operating control units of the single-column lifting platforms 11.

In FIG. 3, an arrangement of three lifting platform systems 19, 20, 21 is shown, which, for example, each have a different number of single-column lifting platforms 11. A first lifting platform system 19 was thereby configured in such a way that it comprises four single-column lifting platforms to lift a two-axle vehicle 18, for example. Eight additional single-column lifting platforms 11 form a second lifting platform system 20, which may serve for the lifting and lowering of a four-axle lorry. Finally, six single-column lifting platforms 11 are combined in a third lifting platform system 21, which for example, is provided for a three-axle omnibus. Additional individual single-column lifting platforms 11 which are not integrated into lifting platform systems at this point, which are characterised by the number 28, are available to the workshop staff for future use.

The lifting platform systems 19, 20 and 21 are located in a contact area 29 or an installation surface of, for example, a workshop, repair hall or warehouse. For the wireless operation of the individual lifting platform systems 11, a frequency band is made available to the contact area 39, said frequency band comprising at least one frequency channel. Several channels are preferably provided within a frequency band. The selection of the number of individual single-column lifting platforms 11 for a lifting platform system 11, as well as the number of lifting platform systems 11 within the contact area 39, is dependent on the activities to be carried out and can be freely adapted thereto.

Inside the first lifting platform system 19, one of the single-column lifting platforms 11 assumes the role of the master 22. The role of slaves 23 was allocated to the remaining single-column lifting platforms 11 of the first lifting platform system 19 within the framework of its configuration.

The role of the master 22 can thus be achieved by pre-programming the single-column lifting platform 11 as such, which means that when configuring the system, such a single-column lifting platform 11 is always assigned as master 22 together with additional single-column lifting platforms 11 in the role of slaves 23. However, it is preferably provided that all single-column lifting platforms 11 are structurally identical and are configured to a lifting platform system 19. By actuating a button of the single-column lifting platform 11, this is assigned the role of the master 22 during the configuration of the lifting platform system 11, and the others will automatically assume the role of the slave 23. Alternatively, this can also take place by a single input on the respective control unit of the single-column lifting platforms 11 in order to define or program this one single-column lifting platform 11 as the master 22. Furthermore, the single-column lifting platforms 11 can all be programmed as slaves 23 and one or several decentralised control units are available, which form the master. These four single-column lifting platforms 11 can thus also be programmed as slaves 23, for example during configuration of a lifting platform system 14 with four single-column lifting platforms, and a control unit can be provided for one of the single-column lifting platforms 11 for this purpose in a decentralised manner, i.e. physically and spatially separated, said control unit forming the master 23. Such an adjustment can also be provided for the additional lifting platforms systems 20, 21 represented in FIG. 3. A combination of the systems described above can equally be utilised inside the contact area 39.

The roles of the single-column lifting platforms are also determined accordingly as master 24, 26 or slave 25, 27 during reconfiguration within the second lifting platform system 20 and the third lifting platform system 21. The additional single-column lifting platforms 28 are in a resting state or standby mode, but can be added to the already configured lifting platform systems 19, 20, 21 by workshop staff if necessary or can serve for additional lifting platform systems.

FIG. 4 shows a flow chart of a lifting platform system 19 according to the invention.

The basis of the representation is thus a standby mode 29, also known as standby, sleep mode or disconnected mode, of the lifting platform system 19 with its single-column lifting platforms 11, in which the lifting platform system 19 is deactivated, but can be activated at any time and without scheduling or long standby times. In this state, which is shown in more detail in FIG. 5, the power demand of the lifting platform system 19, also referred to as no-load loss, is limited to a lower limit which is required for the detection of a potential status change. A particular advantage of the described standby mode 29, as opposed to a continuing resting mode, active mode or continuous operation or complete shutdown of the lifting platform system 19, is that non-permanent setup information, for example regarding the current system configuration, can be stored in the working memory without more expensive technical solutions or semi-permanent storage. At the same time, the standby mode 29 extends the lifespan of sensitive electrical and electronic components of the individual single-column lifting platforms by completely avoiding a loading inrush current as arises during reactivation of the completely shut down device.

In comparison to a conventional continuous operation, substantial power savings result from the standby mode 29, since central components of the single-column lifting platforms 11 which belong to the system, such as, for example, the hydraulic control thereof, are deactivated in the standby mode 29. The reduction in power consumption which is achieved during the use-free phases therefore also extends the period of time in which the individual single-column lifting platforms 11 can be operated independently from the power supply in view of the limited capacity of the accumulators built into them.

In this standby mode 29 of the lifting platform system 19, its activity is thus restricted according to the methods known as polling in computer science to checking the status of the system by means of cyclic polling. A microprocessor of the control unit that is shifted, for example, by means of a SLEEP or STOP command in the standby mode is thereby reactivated after termination of a defined sampling interval 30, typically in the millisecond to second range. When actuating an alarm button in the control panel of the control unit, the control unit conducts an enquiry 31 and checks the current radio channel on radio communications. If the control unit does detect another occupancy of the adjusted radio channel in the context of this testing 32, the lifting platform system 19 remains in resting state for the time being. A channel is regarded as occupied if the carrier signal corresponding to the nominal frequency of the channel, also known as carrier, is received. The control unit displays this case to the workshop staff, preferably via the control panel, so that the present user is informed about the temporary obstruction of the radio channel and can repeat the demand, at most after a short delay, by pressing the alarm button again. A separate alarm button can be provided on the control unit as a control button. However, the alarm button is preferably combined with an additional function key which is provided on the control unit, which means that a button for lifting and lowering is available to the user for example, yet when actuating this “lifting” or “lowering” button, the alarm button or an alarm function is also activated at the same time in the control of the control unit. In this case, the alarm button is not physically available, but rather is integrated or carried out as a program step, so that when the function key is actuated, the function represented on the function key is not started immediately.

If the adjusted channel proves itself as free within the framework of the testing 32 and is thus available to the lifting platform system 19 for the coordination of the single-column lifting platforms 11 assigned to it, the control unit shifts the lifting platform system 19 from standby mode 29 into an active operating mode 34. At the same time, this change in state can be displayed in the display of the control unit. In this state, the functionality of the lifting platform system 19, which lies in lifting and lowering of the load handling attachment 15 of the single-column lifting platform 11 assigned to it, is available in full. The radio transmitters of the single-column lifting platforms 11 belonging to the system are activated for this purpose in particular. The radio communications on the adjusted radio channel, which are produced by this and are necessary for the coordination of the single-column lifting platforms 11, thereby signal to the other lifting platform systems 20, 21 at the same time that the channel for this lifting platform system 20, 21 is to be regarded as occupied and is not available. Its transmitters are switched off and only the receivers of the control units of the single-column lifting platforms 11 of the additional lifting platform systems 20, 21 are active. Only after termination of the activity of the lifting platform system 19, the duration of which depends on the demand of the user and the physical boundary conditions of the application, does the control unit automatically switch the lifting platform system 19 into the standby mode 29.

If, during its standby mode 29 in the framework of its sampling cycle, the control unit of the master 22, 24, 26 of the lifting platform systems 19, 20, 21 states that the alarm button is not currently pressed, it still carries out user-independent testing 35 of the current radio channel on radio communications. If this reveals that no other lifting platform system 19, 20, 21 is using the adjusted channel for the coordination of its single-column lifting platforms 11 at that moment in time, the control unit of the respective master 22, 24, 26 maintains the standby mode 29.

However, if corresponding radio communications reveal the activity of another lifting platform system 19, 20, 21, the control unit of the master 22, 24, 26 of the lifting platform system 19, 20, 21 triggers a state transition from standby mode 29 into a passive operating mode 36. The control unit reveals this status change to the workshop staff via a corresponding display (for example: “channel occupied”). In this passive operating mode 36, the transmitters of the lifting platform system 19, 20, 21 also remain in the inactive state; however, the radio communications from the other active lifting platform systems are continuously received, in order to be able to determine conclusion of its activity. As soon as this is the case, the respective control unit of the master shifts the respective lifting platform system 19, 20, 21 from passive operating mode 36 back into the standby mode 29. This state change is displayed in the display of the control unit.

In FIG. 6, a modified program flow chart of the flow chart described in FIG. 4 for the lifting platform system 19, 20, 21 is represented. This differs in its reaction to a possible occupancy of the adjusted radio channel when the alarm button is pressed. While in this case the embodiment according to FIG. 4 provided the maintenance of the standby mode 29 of the lifting platform system in the case of a corresponding response to the user, and can only be activated if the additional lifting platform system has terminated its lifting or lowering movement, the present embodiment enables a more flexible reaction to its demand for implementation. This reaction consists in an independent channel shift 37 of the lifting platform system 19, 20, 21 onto a channel of a frequency range which is still available and which is certified and approved for the contact area 39. For this purpose, the channel is initially incremented according to a determined, normally cyclic search procedure. Typically, radio channels which come into question are thus sorted in ascending order and numbered consecutively according to their frequency range.

The channel distribution thus depends significantly on pre-existing boundary conditions such as the boundary of the available frequency band by the legislating body, the transmission rate to be achieved as well as the probability of possible interference effects. In the exemplary frequency range of 433.05 to 434.65 MHz, reaching a transmission rate of 50 Kbits/s thus requires a bandwidth of approx. 100 kHz and a corresponding channel spacing of approx. 200 kHz. As a result, such increments lead to a number of nine available radio channels. Such applications are referred to as Short Range Devices (SRD) in radio technology, since they typically enable ranges of between 0.5 and 2 km, and make use of a communal area known as ISM Band, as is also used, for example, by medical devices, wireless thermometers, wireless headphones and mobile speed measuring devices.

The control unit implements a channel change 37 to the next higher channel number based on this channel distribution, wherein exceeding the highest channel number prompts the control unit to resume the search for the lowest channel number. Since the control units of all single-column lifting platforms 11 of the lifting platform system 19, 20, 21 use the same search procedure, the channel shift 37 thus takes place synchronically inside the respective lifting platform system 19, 20, 21, so that the radio connection between the control units of the individual single-column lifting platforms 11 of the respective lifting platform system 19, 20, 21 does not tear off, but substantially continues to remain intact.

As soon as the receivers of the control units of the single-column lifting platforms 11 of the respective lifting platform system 19, 20, 21 is adjusted to the new radio channel, this radio channel is also examined in view of other radio communications, wherein the above procedure is repeated accordingly. The control units normally continue this channel search until a more free radio channel is found. Thereafter, the control units trigger a transition from standby mode 29 into the active operating mode 34, wherein the transmitters and receivers of all single-column lifting platforms 11 of the respective lifting platform systems 19, 20, 21 are operated on the free radio channels found.

Only in the rather rare case that the occupancy of all channels can be declared after a full search 38 of the frequency range, the control units of the single-column lifting platforms 11 of the respective lifting platform systems 19, 20, 21 react in a way which is analogous to the embodiment of FIG. 4, in that they maintain the standby mode 29 of the lifting platform system 19, 20, 21 and confirm the situation via the display. The user who is informed in this way about the temporary obstruction to the frequency band can repeat the demand, at most after a short delay, by pressing the alarm button again.

FIG. 7 shows a chronology of the operating modes described for an alternating operation of several lifting platform systems on a pre-existing radio channel according to one of the figures shown, wherein n symbolises the total number of lifting platform systems 19, 20, 21 adjusted onto this channel. The lifting platform systems 19, 20, 21 which are referred to in this context as sets, are thus numbered consecutively, wherein sets placed in standby mode 29 are schematically represented as hatched rectangles. Sets in the passive operating mode 36 are shown as plain rectangles, while those in active operating mode 34 are highlighted by their thick border.

As the illustration in FIG. 7 shows, all sets are initially found in standby mode 29. At time point t1, the alarm button of one of the single-column lifting platforms 11 assigned to set 2 is now actuated, which shifts all single-column lifting platforms 11 of this set from standby mode 29 into the active operating mode 34 according to the represented program logic regarding FIGS. 4 and 5. Almost simultaneously, the remaining sets 1 and 3 to n detect the radio communications generated by the activity of set 2 and shift themselves from standby mode 29 into the passive operating mode 36. This configuration continues, contingent upon the user demand and physical boundary conditions, until the activity of set 2 can be considered as concluded in time point t2 and the corresponding radio communications come to a standstill on the channel at issue. The remaining sets 1 and 3 to n also detect this case with minimal delay and revert to standby mode in the same manner as the previously active set 2. Only at time point t3 does the situation change again as the alarm button of a single-column lifting platform 11 assigned to set 1 is actuated. According to the previous activation of set 2, set 1 now shifts from standby mode into active operation mode and allows the remaining sets 2 to n to change into the passive operating mode, in order to eliminate the possibility of mutual interference of the sets.

The invention claimed is:

1. A method for the operation of a lifting platform system, said lifting platform system having at least two single-column lifting platforms that each have a control unit and a loading handling attachment, wherein each control unit has a transmitter and a receiver, the method comprising:

selecting a predetermined number of single-column lifting platforms for the formation of the lifting platform system, implementing the single-column lifting platforms and configuring the single-column lifting platforms to the lifting platform system by setting up a radio connection on a radio channel between the control units of the single-column lifting platforms, shifting the lifting platform system into a standby mode after the configuration of the single-column lifting platforms or after termination of an actuation process for lifting or lowering the load handling attachment of each of the single-column lifting platforms, and activating the receiver of each control unit and deactivating the transmitter of each control unit in said standby mode.

2. The method according to claim 1 further comprising:

performing user-independent testing on radio communications of an adjusted radio channel, maintaining the standby mode if no radio communications are detected, shifting the lifting platform system into a passive operating mode if the radio communications of an additional lifting platform system on the same radio channel are deactivated, wherein shifting of the lifting platform system into the passive operating mode includes receiving the radio communications of the additional lifting platform system, and shifting the lifting platform into the standby mode when the radio communications are shut off.

3. The method according to claim 2, wherein performing user-independent testing includes carrying out the user-dependent testing periodically on the radio communications in predetermined periods of time.

4. The method according to claim 2 further comprising:

performing testing to establish whether the radio channel is occupied if an alarm button is pressed in the standby mode.

5. The method according to claim 4 further comprising:

shifting the lifting platform system into an active operating mode if the radio channel is free, or maintaining the standby mode if the alarm button is pressed and the radio channel is occupied.

6. The method according to claim 4 further comprising:

searching for a free radio channel if the alarm button is pressed and the radio channel is occupied, channel shifting to the free radio channel and shifting the lifting platform system into the active operating mode if the free radio channel is detected, or maintaining the standby mode if no free radio channel is detected.

7. The method according to claim 6, wherein searching for the free radio channel further comprises restricting the search for radio channels to a predetermined frequency band.

8. The method according to claim 1 further comprising:

providing a decentralised operator unit as a master and configuring the single-column lifting platforms as slaves.

9. The method according to claim 1, for operating several lifting platforms, which are provided on a spatially limited installation surface.

10. The method according to claim 1 further comprising:

selecting or programming, or both selecting and programming at least one of the single-column lifting platforms as a master, and configuring additional single-column lifting platforms as slaves.

* * * * *